(12) United States Patent
Li et al.

(10) Patent No.: US 8,174,953 B2
(45) Date of Patent: May 8, 2012

(54) INPUT CURRENT CHANNEL DEVICE

(75) Inventors: Shengyuan Li, Irving, TX (US);
Indumini W. Ranmuthu, Plano, TX (US); Marius V. Dina, Inver Grove Heights, MN (US)

(73) Assignee: Texas Instruments Incorporated, Dallas, TX (US)

( * ) Notice: Subject to any disclaimer, the term of this patent is extended or adjusted under 35 U.S.C. 154(b) by 103 days.

(21) Appl. No.: 12/622,559

(22) Filed: Nov. 20, 2009

(65) Prior Publication Data
US 2010/0315917 A1    Dec. 16, 2010

Related U.S. Application Data

(60) Provisional application No. 61/186,184, filed on Jun. 11, 2009.

(51) Int. Cl.
*G11B 7/00* (2006.01)
(52) U.S. Cl. ..................................................... 369/116
(58) Field of Classification Search .................. None
See application file for complete search history.

(56) References Cited

U.S. PATENT DOCUMENTS

| | | | | |
|---|---|---|---|---|
| 4,646,103 A | * | 2/1987 | Sugiyama et al. | 347/224 |
| 5,495,466 A | * | 2/1996 | Dohmeier et al. | 369/53.36 |
| 5,572,502 A | * | 11/1996 | Naruse et al. | 369/116 |
| 6,157,606 A | * | 12/2000 | Inazawa et al. | 369/116 |
| 6,242,960 B1 | * | 6/2001 | Bae | 327/299 |
| 6,392,970 B1 | * | 5/2002 | Fuji et al. | 369/47.5 |
| 7,136,342 B2 | * | 11/2006 | Gushima et al. | 369/59.12 |
| 7,872,928 B2 | * | 1/2011 | Park | 365/194 |
| 2003/0112732 A1 | * | 6/2003 | Masui et al. | 369/59.12 |
| 2003/0231064 A1 | * | 12/2003 | Sano | 331/1 A |
| 2005/0018578 A1 | * | 1/2005 | Ogura et al. | 369/59.21 |
| 2010/0315917 A1 | * | 12/2010 | Li et al. | 369/47.15 |

* cited by examiner

*Primary Examiner* — Peter Vincent Agustin
(74) *Attorney, Agent, or Firm* — Alan A. R. Cooper; David V. Stephens; Frederick J. Telecky, Jr.

(57) ABSTRACT

An input current channel device is described. This device comprises a first terminal for receiving a reference signal; a second terminal for receiving a first target signal; a pass through device coupled to the first terminal, the pass through device operative for transmitting a delayed reference signal in response to receiving the reference signal; a first combination logic device coupled to the first terminal and the second terminal, the first combination logic device operative for transmitting a first combination logic signal in response to receiving the reference signal and the first target signal; a selection device coupled for receiving the delayed reference signal, the first combination logic signal, and a first synchronization signal, the selection device operative for selectively transmitting a second synchronization signal, and wherein selectively transmitting the second synchronization signal reduces skew between the reference channel and the first target channel.

12 Claims, 8 Drawing Sheets

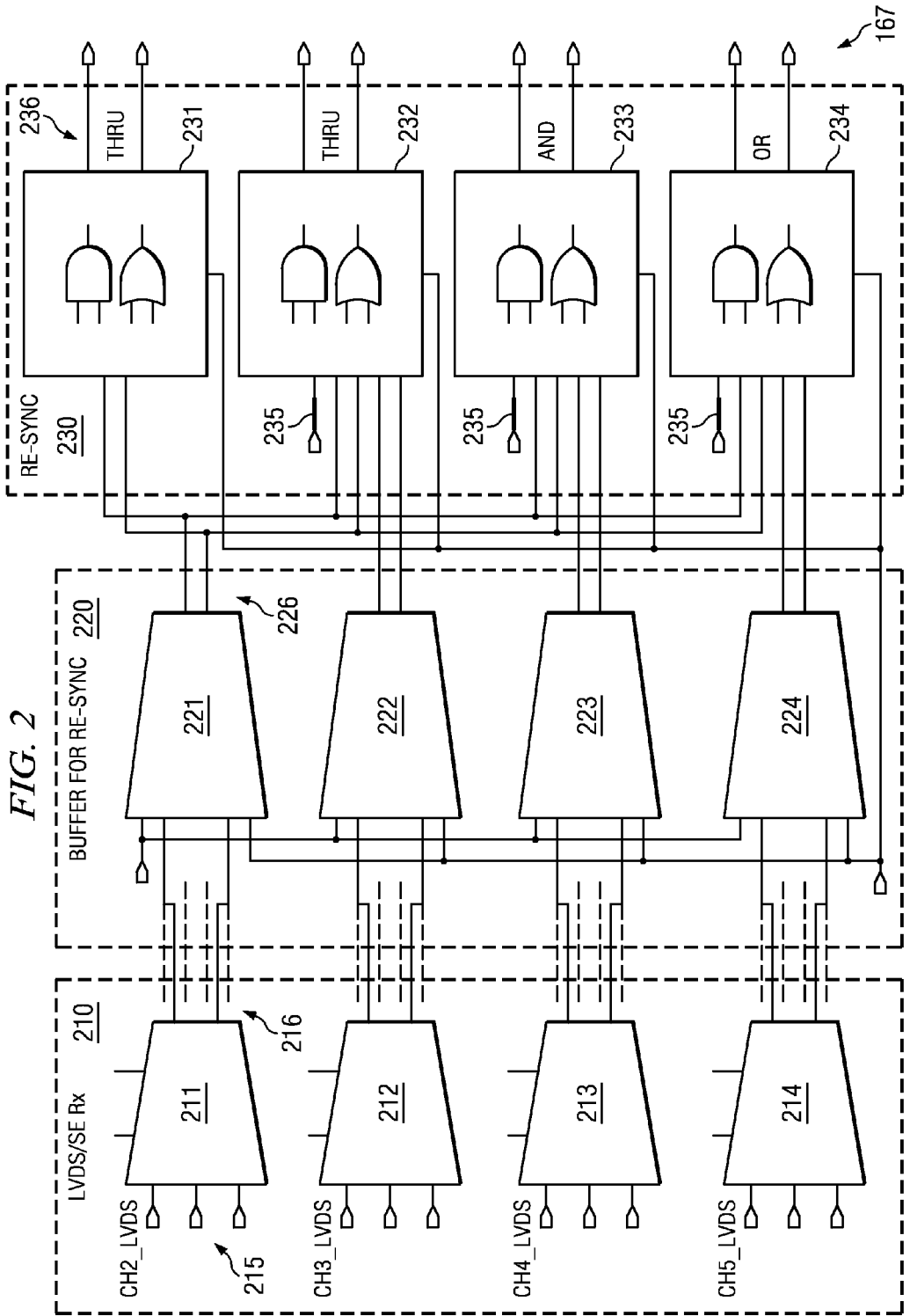

INPUT CURRENT CHANNEL DEVICE

This amendment claims priority under 35 USC §119(e)(1) of provisional application No. 61/186,184, filed Jun. 11, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. When these drives include light sources, signals sent to these sources should be properly processed to reduce potential damage in appropriate light emission.

BRIEF DESCRIPTION OF THE DRAWINGS

The input current channel device may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

FIG. 2 is a block level diagram of one implementation of the CICD 167.

Figure 1A:
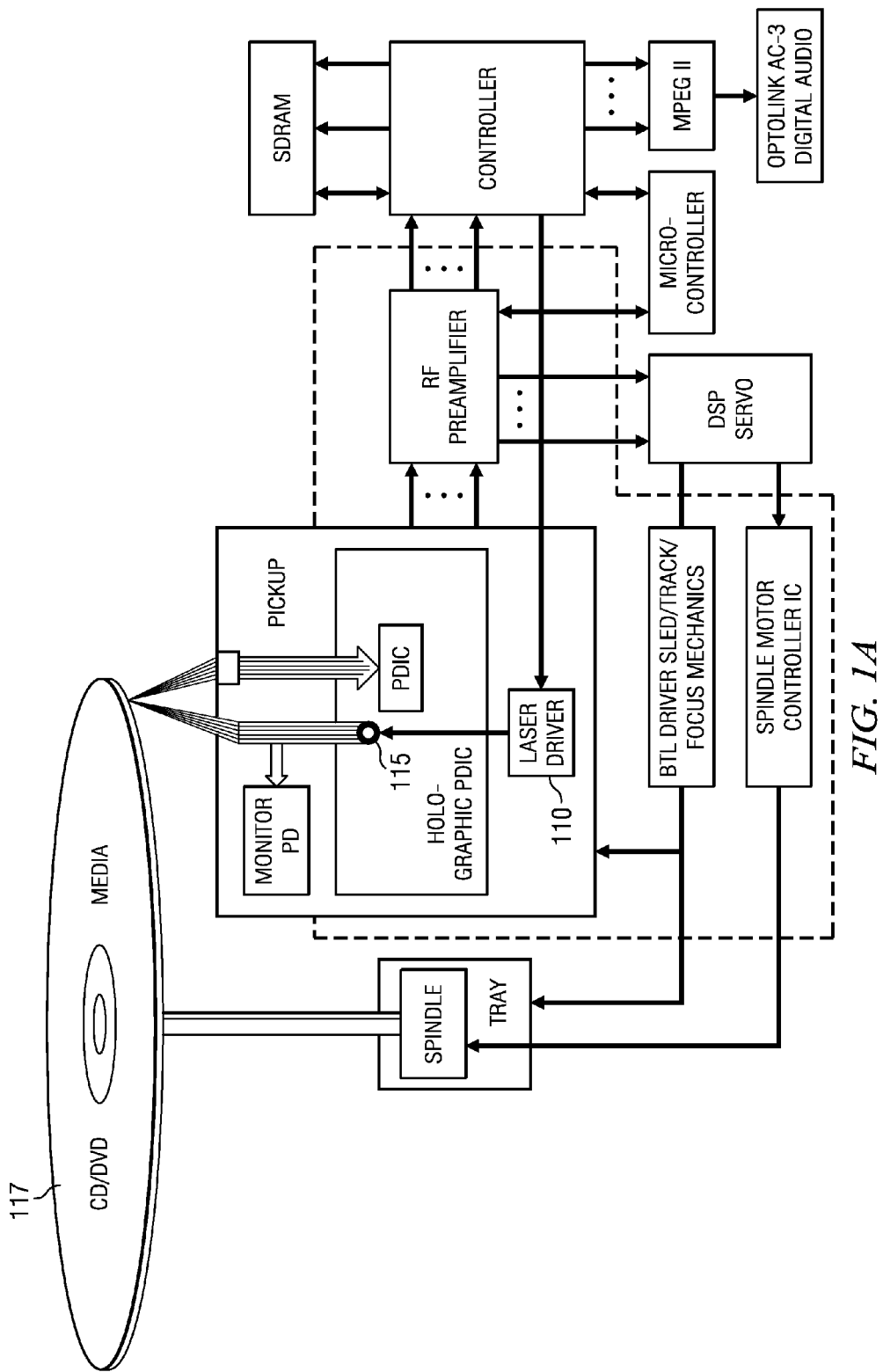
FIG. 1A, is a system drawing illustrating components within an optical disk drive.

While the input current channel device is susceptible to various modifications and alternative forms, specific embodiments have been shown by way of example in the drawings and subsequently are described in detail. It should be understood, however, that the description herein of specific embodiments is not intended to limit the input current channel device to the particular forms disclosed. In contrast, the intention is to cover all modifications, equivalents, and alternatives falling within the spirit and scope of the input current channel device as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1A, is a system drawing illustrating components within an optical disk drive 100. A controller 102 monitors the output light over level of a laser diode 115 using a Monitor PD 104, or monitor photodiode, and an RF, or radio frequency, preamplifier 106. This controller can keep an expected power level by changing an input control current of a laser driver 110 through an APC, or auto power controlling, feedback loop, even if a light source 115 such as a laser diode, has many changes of the output power due to various condition changes, such as temperature etc.

Also, the controller 102 sets the enable signal for switching some current channels of the laser driver 110, which arranges a data writing pulse. In the case of data reading, the controller 102 may only set the DC current by disabling the switching and applying the indicated input current. In the case of data writing, the controller 102 applies some adjustment signals, or enable-switching signals, to arrange the writing pulse waveform as a combination of switching timing, which also changes the power level by different indicated current of each channel. The controller 102 can arrange these indicated currents based on the Monitor. PD 104 output with some detecting function in the RF preamplifier 106. At the very least, this controller has two controlling levels for the reading power and the writing power. Sometimes the controller may get the top, bottom, or average level of a writing pulse and calculate to control some power levels independently.

As illustrated in this figure, the laser driver 110 sends a signal that prompts an associated light source 115 (e.g., laser diode) to emit light. The light source 115 may emit light at any of a number of wavelengths (e.g., 400 nm, 650 nm, 780 nm). Light from this source contacts an associated optical media 117, such as a compact disc (CD), blue ray device (Blu-ray), or digital versatile disk (DVD). Light contacting the optical media can either facilitate data storage or data retrieval from the optical media 117.

Figure 1B:
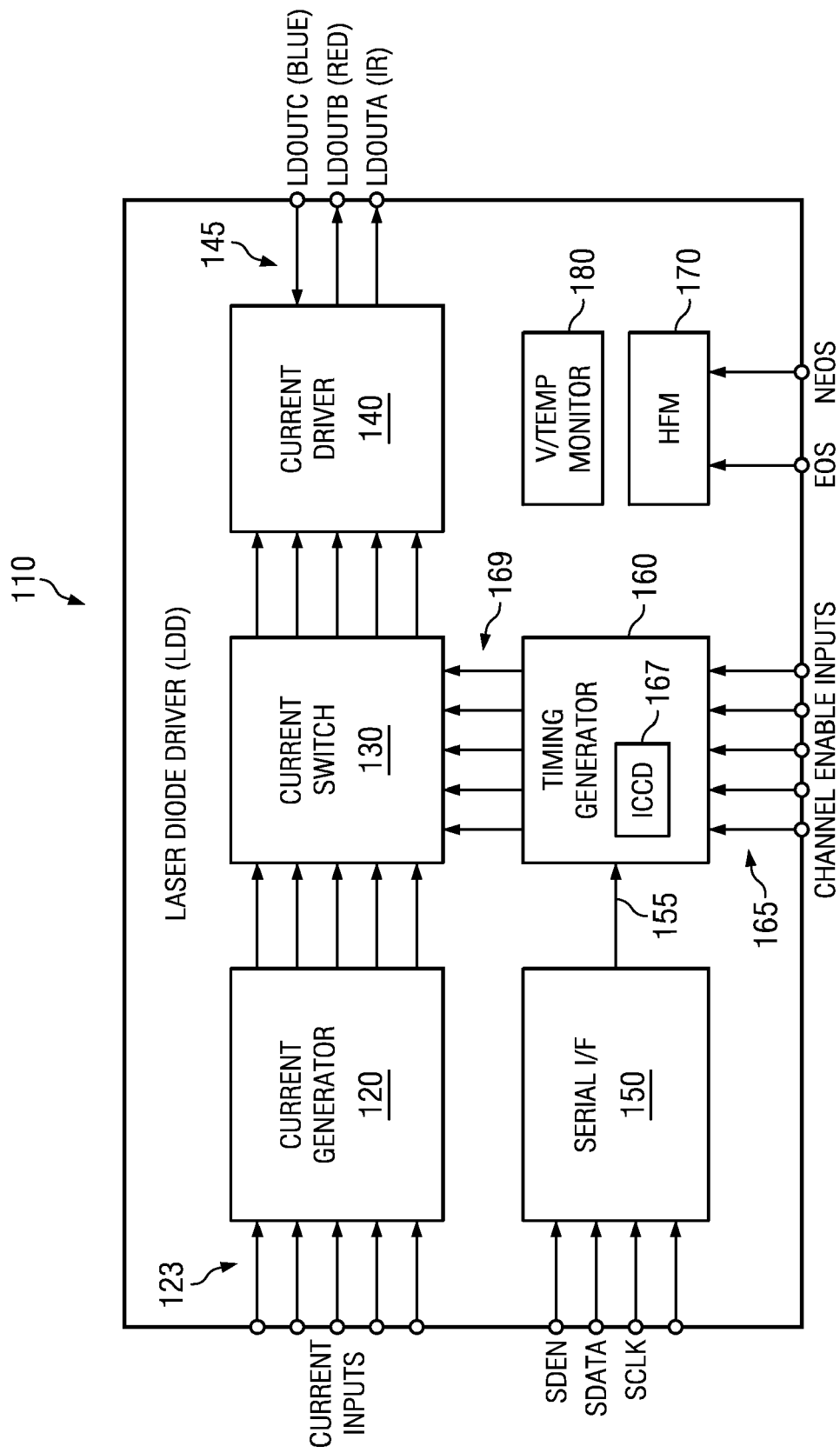
FIG. 1B is an environmental drawing including a laser diode driver current input signal processing system.

FIG. 1B is an enlarged view of the innovative laser driver 110, which may be a laser diode drive (LDD). The LDD 110 is an integrated, fully programmable, multi-function product that controls and drives laser diodes (e.g., light source 115) within optical drives as described with reference to FIG. 1A. More specifically, the LDD 110 can apply the current for the read, write, and erase removable high capacity disks (e.g., capacities greater than approximately 50 Gbytes/disk). The LDD 110 also has low noise (e.g., noise of approximately 0.5 nA/rt-Hz), high speed (e.g., 1 Gb/s, 850 Gb/s) and high current (e.g., approximately 1 amp). Any numbers included in this application are for illustrative purposes only and numerous alternative implementations may result from selecting different quantitative values.

At a high level, the LDD 110 may include a current generator 120. Generally, the current generator 120 receives some input signals 123 associated with several input channels, which have an associated input current. This current generator 120 works in tandem with a current driver 140 and produces a gain for the input current. As a result, the current generator 120 and current driver 140 control the amount of current for each output channel 145. For, the input signals that the current generator 120 receives, it transmits output signals that a current switch 130 receives. The current switch 130 decides which of the input channels should be turned on or turned off. For the channels that should be turned on, the current switch 130 makes those channels active. Similarly, the current switch 130 inactivates the channels that should be turned off and transmits output signals reflecting this change. The current driver 140 receives these output signals from the current switch 130 as input signals. The current driver 140 is the last current gain stage and drives the laser diode directly. In other words, the output signals from the current driver 140 also serve as output signals for the LDD 110, which are used in driving the lasers, or the light source 115 (see FIG. 1A).

In addition to the above-mentioned devices, the LDD 110 includes additional components. A serial interface (I/F) 150 has several inputs 155 (e.g., serial data enable, serial data, serial clock) that may be used for an enable, feature selection, or setting the gain. Like the serial interface 150, the timing generator 160 receives various channel enable inputs 165. Though there are five channel enable inputs that are shown in FIG. 1B, the LDD 110 may have any number of channel enable inputs, such as two, six, or the like. The timing generator 160 determines the time at which a given input channel will be either turned on or turned off. The LDD 110 also includes a high frequency modulator (HFM) 170 and voltage/temperature monitor (V/Temp Monitor) 180. The HFM 170 modulates the output current for reducing mode-hopping noise of the laser diodes. The voltage/temperature monitor 190 monitors the laser diode voltage drop and on-chip temperature. One skilled in the art will appreciate that numerous alternative implementations may result from removing any or several of the blocks within the LDD 110.

As indicated in FIG. 1B, the timing generator 160 includes an input current channel device (ICCD) 167. This device may receive either a low voltage differential signal (LVDS) or a single-ended (SE) signal, which gives maximum flexibility. In addition, this device also works with single ended (SE) logic that is either approximately 2.5V or approximately 3.3V. At a high level, the ICCD 167 can maintain a very low skew among input channels using an equal delayed "AND", and "OR" with a "Thru" function between the target channels and reference channel, which allows resynchronization. Normally, this skew results from different path lengths for either target signals, signals on the target channels, or reference signals, signals on the reference channel. With the ICCD 167, the skew between channels may be approximately 10 ps with an overall propagation delay of only approximately 1 ns. Since the skew affects either the rising edges or falling edges of a write pulse, minimizing skew helps create a more well-defined write current pulse, which improves accuracy in writing data to an optical disk, such as optical media 117.

To achieve an effective, or fast, rise time and fall time and generate a correct, or well-defined, write current pulse for good write marks in disk, the output current from the LDD 110 is usually a combination of several current channels. With the ICCD 167, each target channel can be turned on and off via some switching control, or synchronization, signals from the controller chip as further described with reference to FIGS. 2-3. The target signals can be synchronized with the reference signal such that the corresponding channel's current edges line up with each other when they enter the output driver, or current driver 140.

FIG. 2 is a block level diagram of one implementation of the CICD 167. In this implementation, the CICD 167 has three different stages, though an alternative implementation may vary the number and types of stages. There is a receiver stage 210 that receives the input channel enable signals 165, described with reference to FIG. 1B. As mentioned above, the timing generator 160 determines the time at which a given input channel will be either turned on or turned off and supplies a signal to either enable or disable the associated input channel. In this implementation, the receiver stage 210 includes four input stages 211-214 or receivers for write channel 2, 3, 4, and 5, with each having three input terminals 215 (two for input signals and one for enable signal) and two output terminals 216. Each of these receivers converts an input enable signal to a differential enable signal, which gets transmitted on the output terminals 216; hence, these receivers can receiver either an LVDS signal or an SE signal.

A buffer stage 220 receives the differential enable signals from the receiver stage 210. This buffer stage includes at least one buffer associated with each of the receivers in the receiver stage 210. More specifically, buffers 221-224 receive differential signals from the receivers 211-214, respectively. These buffers may be a_ECL or some other suitable type buffer to convert receivers' output signals to the correct voltage levels for the following stages. Each of these buffers has four input terminals of which two connect to the receiver output terminals 216, one connects to the enable signal and the other connects to some biasing voltage. The buffers 221-224 transmits buffered enable signals on their associated output terminals 226 that have a voltage appropriate for re-synchronization, such that output voltage level of 222, 223, and 224 is one VBE lower than those of the buffer 221. Though shown here is one VBE, other shifting voltage levels are equally applicable.

Finally, the re-synchronization stage 230 receives the buffered enable signals from the buffer stage 220. This re-synchronization stage has combinational logic devices associated with buffers. For example, the combinational logic device 231 is associated with the buffer 221 and the combinational logic device 234, which is associated with the buffer 224. In addition, the combinational logic devices 232-234 also include input terminals 235 for receiving a digital synchronization signal. For example, this digital synchronization signal may be a two-bit digital signal, such as signal 155 transmitted by the serial interface 150 described with reference to FIG. 1B. In addition, the combinational logic devices 231-234 can provide any one of many type logic functions, such as a thru function, AND function, or an OR function.

As the re-synchronization stage 230 produces these synchronized enable signals, other devices within the LDD 110 may use these signals. The timing generator 150 transmits synchronized enable signals on output terminals 236 to the current switch 130. This current switch uses these synchronized enable signals in either in enabling or disabling the input channels 123 (see FIG. 1B). As a result of this, the skew between these input may be substantially reduced, which means that the current driver can transmit a well-defined write pulse to associated laser diodes, which increases the accuracy in writing data to the optical media 117 (see FIG. 1A).

Figure 3:
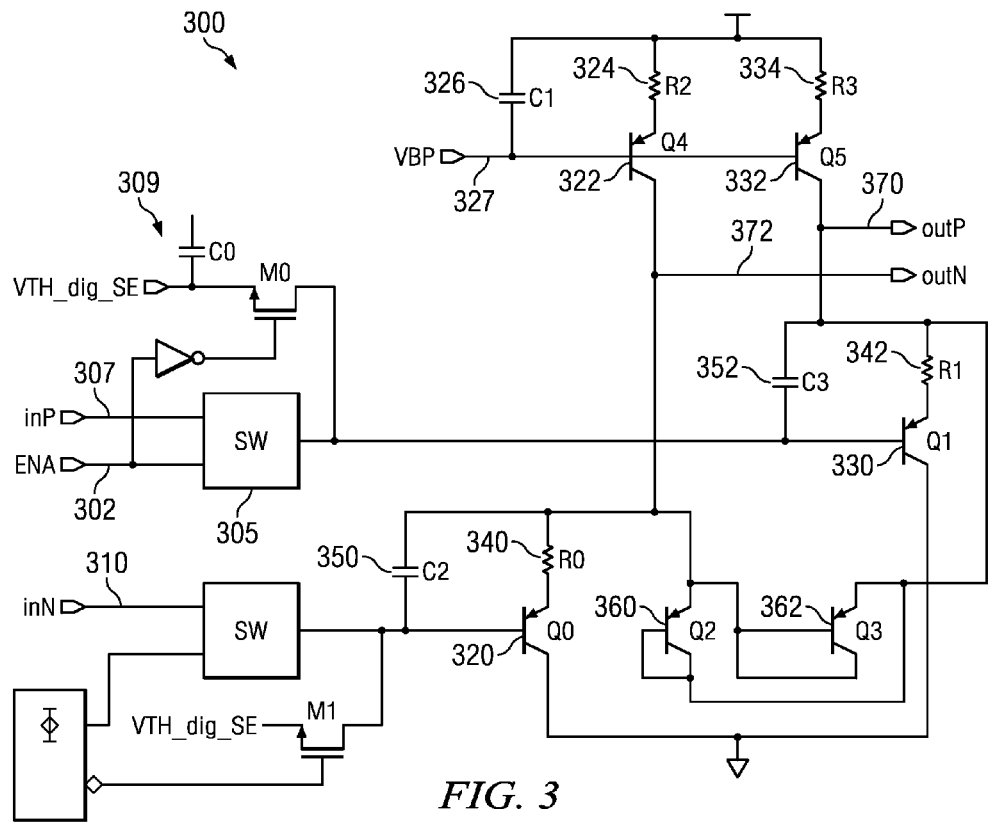
FIG. 3 is a block diagram for one implementation of a receiver in the receiver stage described with reference to FIG. 2.

FIG. 3 is a circuit diagram 300 illustrating one implementation of a receiver in the receiver stage 210. This circuit diagram is applicable to any of the receivers 211-214 in this receiver stage. When a channel enable signal (ENA) on the terminal 302 is a logic high, an associated switching device 305 (switch "SW") will be "on" and the input is a LVDS signal. Otherwise, the switch will be open from terminal 307, or on "inP" side, and the input will be a single-ended CMOS logic signal with the threshold voltage stored in a device 309 (C0) through "VTH_dig_SE" associated with the terminal 310 on "inN" side. Thus, this receiver can accommodate either LVDS signals or SE signals.

In addition, the receiver illustrated with the circuit diagram 300 also includes emitter followers, resistors for level shifting and a feedback path. Active device 320 (Q0) is an input of a first emitter follower biased via device 322 (Q4) and device 324 (R2); similarly, active device 330 (Q1) is an input of a second emitter follower biased via device 332 (Q4) and device 334 (R2). Device 326 (C1) serves as a bypass capacitor for both of these emitter followers. In selecting sizes or characteristics for these devices, one can select a threshold voltage of approximately 0.7V for the transistors, a resistance of approximately 1.2K, and capacitance of approximately 0.5 pF. Device 340 (R0) and device 342 (R1) can provide level shifting. Device 350 (C2) and device 352 (C3) provide a feed forward path that speeds up the signal transitions between different voltage levels. Device 360 (Q2) and device 362 (Q3) are clamp diodes that limit voltage difference between those two output terminals 370 and 372. The terminals 307, 310, and 302 may correspond to the input terminals 215 for any of the receivers of FIG. 2. Similarly, the terminals 370, 372 may correspond to the output terminals 216 for any of the receivers of FIG. 2.

Figure 4:
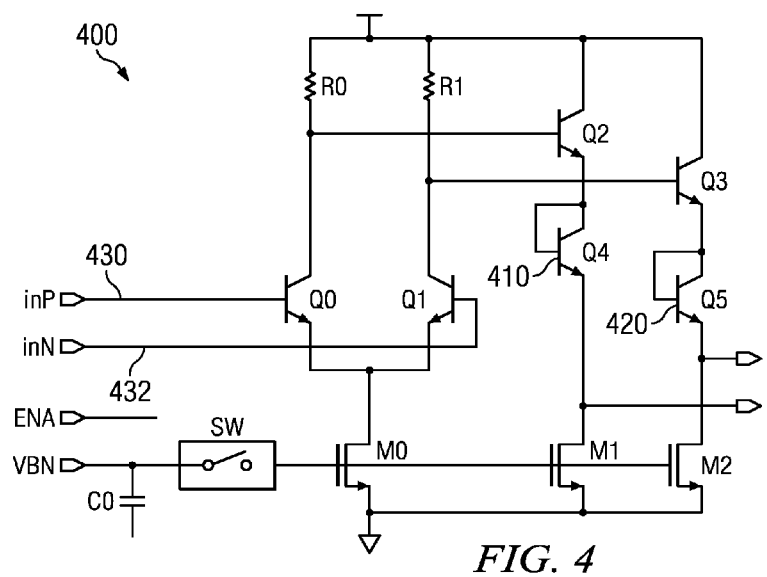
FIG. 4 is a block diagram for one implementation of a buffer in the buffer stage described with reference to FIG. 2.

Turning now to FIG. 4, this figure is a block diagram 400 for one implementation of a buffer in the buffer stage 220 described with reference to FIG. 2. Device 410 (Q4) and device 420 (Q5) are for level shifting. This level shifting may be particularly beneficial for certain input channels and less beneficial for others. For example, level shifting may be used for channel 3, 4, and 5, which may be connected to lower inputs of a combination logic device. In contrast, channel 2 which may serve as the reference channel may not include this level shifting and essentially bypass the buffer stage 220. An alternative implementation may not include the buffer stage 220. At a high level, this level shifting generally involves receiving signals from the terminals 370, 372 of the receiver stage 210 that connect to terminals 430, 432 of the buffer stage 220. The voltage of these signals change by either including 410 and 420 or not including them. Therefore, the voltage level will differ by one VBE. Though shown here is one VBE, other shifting voltage levels are equally applicable.

Figure 5:
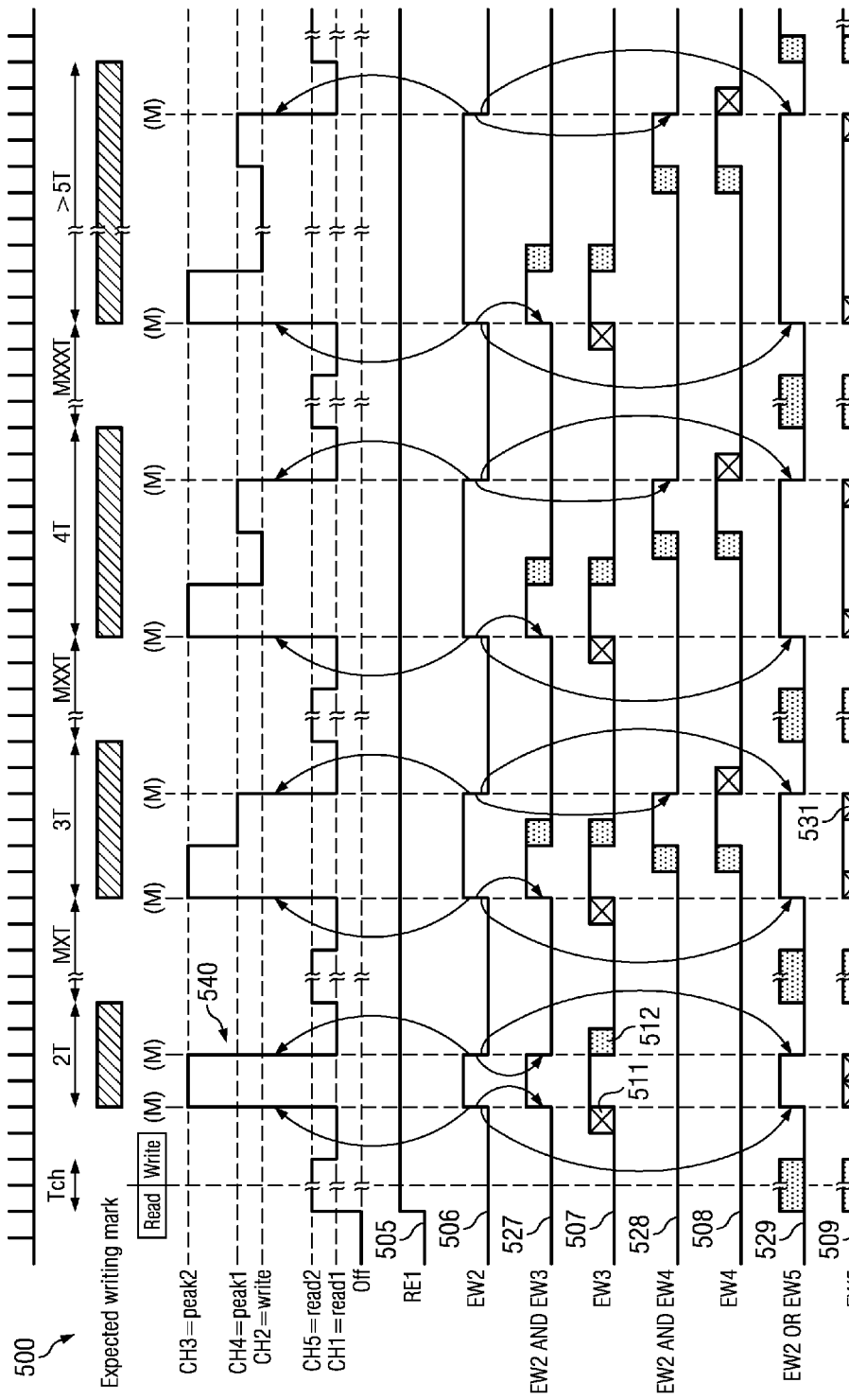
FIG. 5 is a timing diagram illustrating how a driver output current varies for with the variation of individual output currents for each of the input channels of FIG. 2.

FIG. 5 is a timing diagram 500 illustrating how the LDD output current varies with the variation of individual output current enable signals for each of the input channels described with reference to FIG. 1B. Plot 505 illustrates the output current enables for a read pulse over time associated with a single read channel shown as one of the input channels 123. Similarly, plots 506-509 correspond with output current enables for write pulses associated with four write channels within the input channels 123. The plot 506 (EW2) can be associated with the reference channel, while plots 507-509 can be associated with the target channels. When this is done, plot 507 (EW3) transitions from a logic low state to a logic high state a little before, or leading, the plot 506, as indicated by the region 511. And, the plot 507 (EW3) transitions from a logic high state to a logic low state a little after, or lagging, the plot 506, as indicated by the region 512. The region 511 has a great impact on how well data gets written, while the region 512 has a much smaller impact when the delay is small. In fact, the impact of the region 512 may be limited by a system controller. This system controller may reduce this region using predefined timing associated with feed forward path described with reference to the device 352 in FIG. 3.

Logic functions can be used in aligning pulse edges. As shown in this figure, if an "AND" function is used, one can line up the rising edges of the target channels with the reference channel if target channel's edge is leading. For example, the plot 527 is the outcome of "ANDing" the plot 506 with the plot 507, which results in eliminating the region 511 and aligning the rising edges of the write pulse. If an "OR" function is used, one can line up the falling edges with the reference channel if target channel's edge is lagging. For example, the plot 529 is the outcome of "ORing" the plot 506 with the plot 509, which results in adding a region 531 and aligning the falling edges. Instead of using the plot 507 as the enable signal associated with target channel EW3, the plot 527 is used as the new enable signal for target channel EW3.

Returning to FIG. 1B, the ICCD 167 produces this enable signal and the timing generator 160 transmits to the current switch 130. Since the enable signal for the reference channel EW2 is a reference, it may remain the same, such that the timing generator merely re-transmits this enable signal. Though described with reference to one of the target channels, the logic functions can be used with any of the target channels. The logic functions synchronize the target channel and the reference channel, which correspondingly reduces skew. The timing generator transmits these synchronized channel enable signals 169 to the current switch 130. The current driver 140 transmits output current signals 145 representative of the whether a channel current switch remains open or closed, which is controlled by the synchronized channel enable signals 169.

Each of the output current signals 145 is a superposition of the output currents from the associated input current channels. In FIG. 5, the peak 540 represents a superposition of the output currents for each enabled channel.

Figure 6:
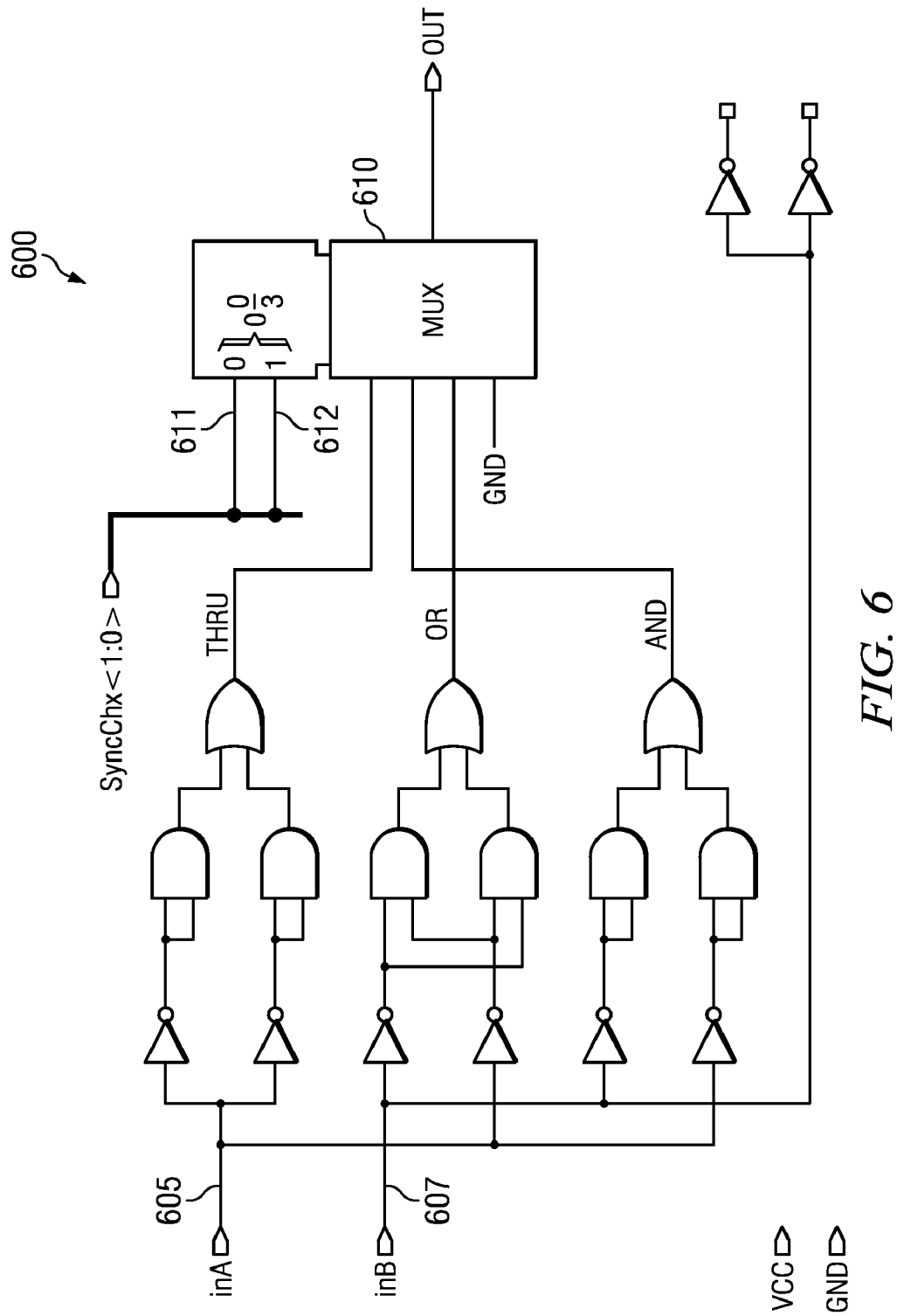
FIG. 6 is a circuit diagram of a CMOS implementation of a portion the ICCD of FIG. 2 using two input current channels.

FIG. 6 is a circuit diagram 600 for a CMOS implementation of a portion the ICCD 167 involving two input current channels. The input current channel connected to the terminal 605 may be a reference channel, such as the reference channel EW2 associated with the plot 505, described with reference to FIG. 5. In contrast, the input current channel connected to the terminal 607 may be any target channel, such as the target channel EW5 associated with the plot 509. In this implementation, a combination logic device implements each of the following logic functions: THRU, AND, and OR; this logic device may include a collection of logic gates, such as NOT gates, AND gates, and NOR gates.

Alternative implementations may exist by changing either the type of logic functions or the type of CMOS combination logic gates used in implementing the function. Though this implementation is essentially balanced, it can be slow in terms of propagation delay and rise/fall time. In addition, the circuit diagram 600 includes a multiplexer 610 for transmitting a synchronized current enable signal. In this implementation, the multiplexer's input terminals 611-612 connect to this digital synchronization signal may be a two-digital signal, such as signal 155 transmitted by the serial interface 150 described with reference to FIG. 1B. The multiplexer 610 may be any type of multiplexer, such as a CMOS device. Since the circuit diagram only illustrates a portion of the ICCD 167 involving one reference channel and one target channel, the circuit diagram 600 may be replicated as many times as desired for a given number of target channels. In other words, this diagram may be duplicated two more time if there are a total of three target channels or four more times if there are 5 target channels.

Figure 7A:
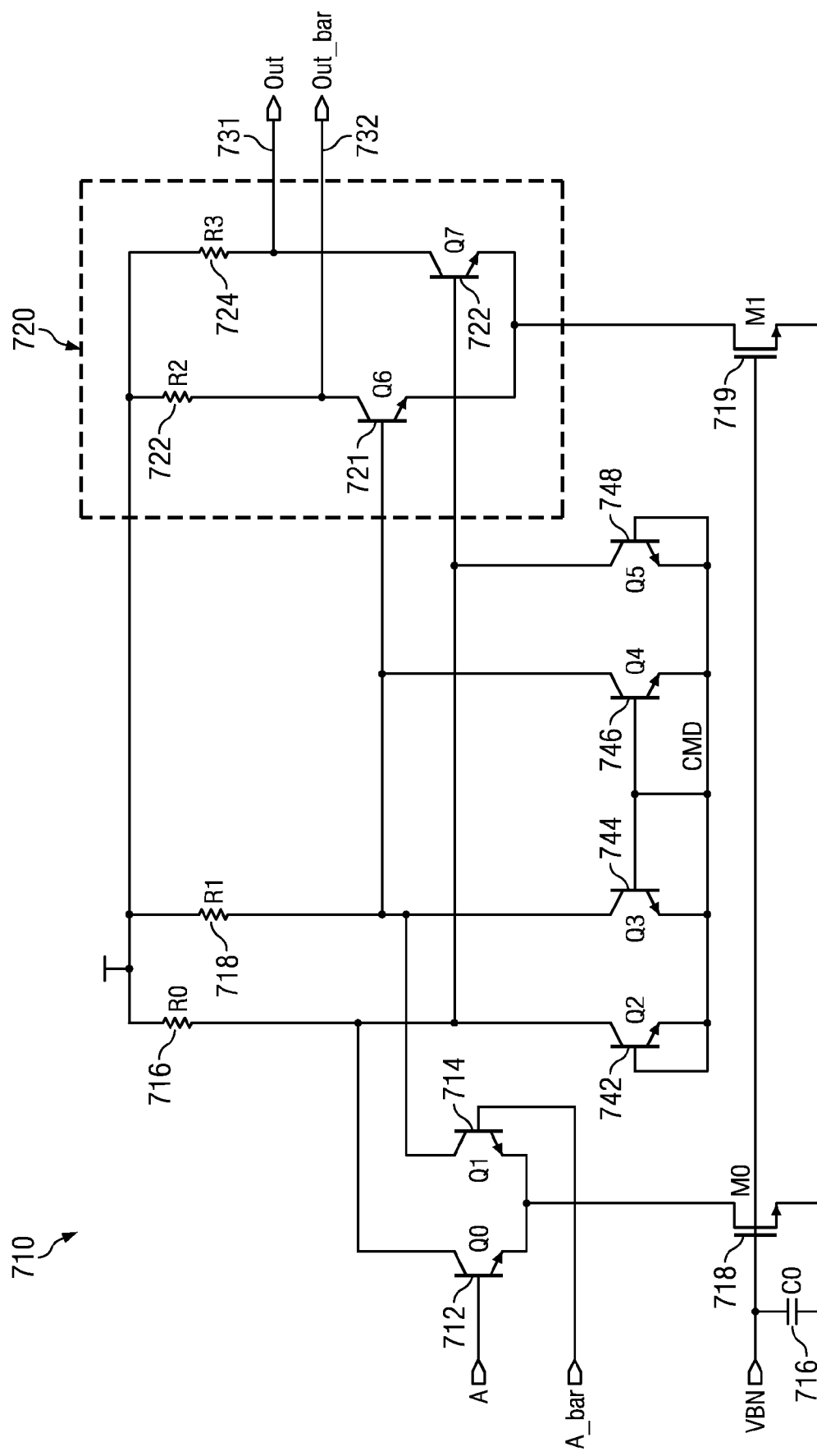
FIGS. 7A-7B are circuit diagrams illustrating alternative implementations of the circuit diagram of FIG. 6 using ECL logic circuits.
Figure 7B:
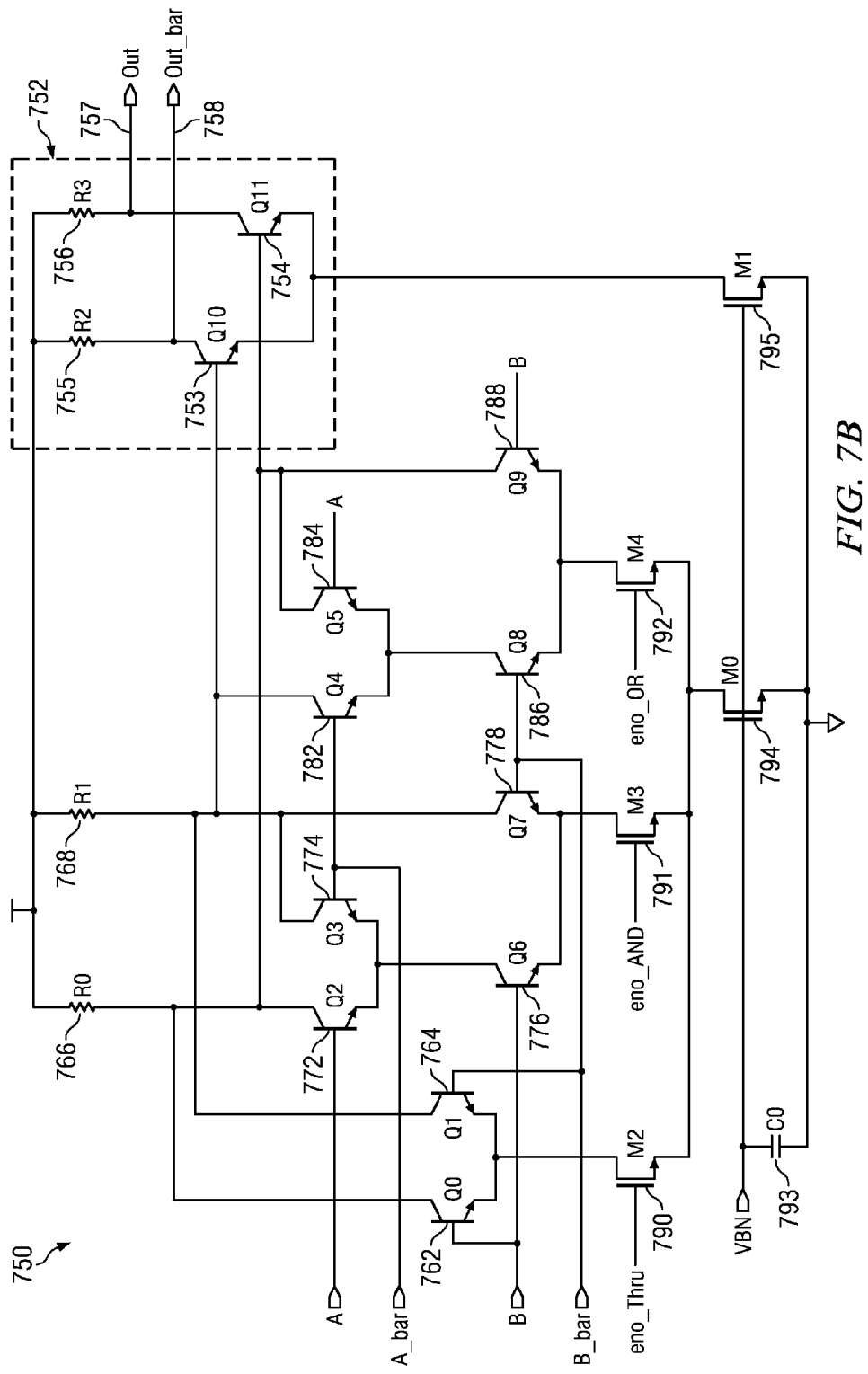

FIGS. 7A-7B are circuit diagrams illustrating alternative implementations of the circuit diagram 600 using ECL logic circuits. These logic circuits improve the propagation delay compared with circuit diagram 600 implementation. FIG. 7A is a circuit diagram 710 illustrating an ECL logic circuit for a reference input channel, such as the reference channel EW2 described with reference to FIG. 5. This circuit includes a differential pair made of devices 712-714 with devices 716-718 that supply resistive loading. Devices 712-718 form one combination logic device and provide the "THRU" function for the reference channel. An output buffer 720 may include devices 721-724 that apply output signals to the output terminals 731-732, which may one of the terminals 236 described with reference to FIG. 2. Devices 742-748 are "dummy" devices for capacitive loading compensation. The device 716 is a bypass capacitor, while devices 718-719 bias the current source. An alternative implementation may result from not including one or more of the following devices: device 721, device 722, device 742, device 744, device 746, or device 748. When selecting the types and sizes of devices within the circuit diagram 710, circuit designers may use the following criteria: optimum speed at the given current density.

Turning now to FIG. 7B, this is a circuit diagram 750 illustrating an ECL logic circuit for a target channel, such as the target channel EW3 described with reference to FIG. 5. This circuit includes a differential pair made of devices 762-764 with devices 766-768 that supply resistive loading, which collectively serve as the "Thru" function for the target channel. This thru function can measure the delay between channels 2, 3, 4, and 5 without the synchronization. Devices 772-778 and devices 782-788 form a combination logic device with the ECL AND logic function and the OR function; these same devices can form a combination logic device with the ECL NAND logic function and the NOR function. Devices 753-756 form an output buffer 752 that apply output signals to the output terminals 757-758, which may one of the terminals 236 described with reference to FIG. 2. Devices 790-793 are the switching devices for a multiplex function, like multiplexer 610. Device 793 is the bypass capacitor, while devices 794-795 are the biasing current source.

While various embodiments of the input channel current device have been described, it may be apparent to those of ordinary skill in the art that many more embodiments and implementations are possible that are within the scope of this system. Although certain aspects of the channel input current device may be described in relation to specific techniques or structures, the teachings and principles of the present system are not limited solely to such examples. All such modifications are intended to be included within the scope of this disclosure and the present channel input current device and protected by the following claim(s).

The invention claimed is:

1. An input current channel device for use with an optical disk drive system, comprising:
    a first terminal for receiving a reference signal;
    a second terminal for receiving a first target signal;
    a pass through device coupled to the first terminal, the pass through device operative for transmitting a delayed reference signal in response to receiving the reference signal;
    a first combination logic device coupled to the first terminal and the second terminal, the first combination logic device operative for transmitting a first combination logic signal in response to receiving the reference signal and the first target signal;
    a selection device coupled for receiving the delayed reference signal, the first combination logic signal, and a first synchronization signal, the selection device operative for selectively transmitting a second synchronization signal, and
    wherein selectively transmitting the second synchronization signal reduces skew between a reference channel that conveys the reference signal and a first target channel that conveys the first target signal.

2. The input current channel device 1, wherein the second synchronization signal is used in writing data to an optical disk in the optical disk drive system.

3. The input current channel device of claim 2, wherein the second synchronization signal creates a well-defined writing pulse for writing the data to the optical disk.

4. The input current channel device of claim 1, wherein the first target signal is a signal selected from the group consisting of a low voltage differential signal and a single ended signal.

5. The input current channel device 1, wherein the skew is approximately 10 ps and the propagation delay is less than approximately 1 ns.

6. The input current channel device of claim 2, wherein the skew is reduced by synchronizing the first target signal with the reference signal.

7. The input current channel device of claim 6, wherein a reference signal edge is synchronized with a first target signal edge selected from the group consisting of a rising signal edge and a falling signal edge.

8. The input current channel device of claim 7, wherein the second combination logic device is selected when the target signal edge is leading the reference signal edge and the rising edges can be aligned.

9. The input current channel device of claim 7, wherein the first combination logic device is selected when the target signal edge is lagging the reference signal edge and the falling edges can be aligned.

10. The input current channel device of claim 1, wherein at least one of the members selected from the group consisting of: a pass through device, an AND device, and an OR device is implemented using emitter coupled logic (ECL) circuits.

11. The input current channel device of claim 1, wherein the pass through device measures delay between the reference channel and the target channel without synchronization.

12. The input current channel device of claim 1, wherein the selection device is selected from the group consisting of a multiplexer and a latch.

* * * * *